(12) United States Patent
Sakai et al.

(10) Patent No.: US 9,165,720 B2
(45) Date of Patent: Oct. 20, 2015

(54) CONDUCTIVE POLYMER/POROUS CARBON MATERIAL COMPOSITE AND ELECTRODE MATERIAL USING SAME

(75) Inventors: Tomoyuki Sakai, Kanagawa (JP);
Tsukasa Maruyama, Kanagawa (JP);
Kaoru Doi, Kanagawa (JP); Manabu Kato, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 14/111,041

(22) PCT Filed: Apr. 10, 2012

(86) PCT No.: PCT/JP2012/059764
§ 371 (c)(1),
(2), (4) Date: Oct. 10, 2013

(87) PCT Pub. No.: WO2012/141166
PCT Pub. Date: Oct. 18, 2012

(65) Prior Publication Data
US 2014/0030594 A1    Jan. 30, 2014

(30) Foreign Application Priority Data

Apr. 11, 2011  (JP) ................................. 2011-087407
Feb. 1, 2012   (JP) ................................. 2013-020373

(51) Int. Cl.
| | | |
|---|---|---|
| H01G 11/32 | (2013.01) | |
| H01M 4/60 | (2006.01) | |
| H01M 4/583 | (2010.01) | |
| H01M 4/36 | (2006.01) | |
| H01G 11/48 | (2013.01) | |
| H01G 11/50 | (2013.01) | |
| H01M 4/587 | (2010.01) | |
| H01M 10/0525 | (2010.01) | |
| H01G 11/38 | (2013.01) | |
| H01G 11/30 | (2013.01) | |

(52) U.S. Cl.
CPC ............... *H01G 11/32* (2013.01); *H01G 11/38* (2013.01); *H01G 11/48* (2013.01); *H01G 11/50* (2013.01); *H01M 4/364* (2013.01); *H01M 4/583* (2013.01); *H01M 4/587* (2013.01); *H01M 4/602* (2013.01); *H01M 10/0525* (2013.01); *H01G 11/30* (2013.01); *Y02E 60/122* (2013.01); *Y02E 60/13* (2013.01)

(58) Field of Classification Search
CPC ...... H01G 11/32; H01M 4/364; H01M 4/602; H01M 4/583
USPC ............................ 429/213; 361/502; 252/511
See application file for complete search history.

(56) References Cited

U.S. PATENT DOCUMENTS

| 7,585,433 B2 * | 9/2009 | Kamakura et al. ............ 252/500 |
| 2008/0042110 A1 | 2/2008 | Kamakura et al. |
| 2008/0117562 A1 | 5/2008 | Maruyama et al. |

FOREIGN PATENT DOCUMENTS

| DE | 10 2007 055 283 A1 | 5/2008 |
| JP | 2003-092104 A | 3/2003 |
| JP | 2008-72079 A | 3/2008 |
| JP | 2008-160068 A | 7/2008 |
| JP | 2008-300639 A | 12/2008 |
| JP | 4294067 B2 | 7/2009 |
| JP | 2010-205870 A | 9/2010 |
| JP | 2011-051828 A | 3/2011 |

OTHER PUBLICATIONS

German Office Action dated Oct. 21, 2014, issued to the corresponding German Patent Application No. 11 2012 011 940.7 and the English translation thereof.
Chen, W-C. et al., "Polyaniline-deposited porous carbon electrode for supercapacitor", Electrochimica Acta, vol. 48, 2003, pp. 641-649.

* cited by examiner

*Primary Examiner* — Karie O'Neill Apicella
(74) *Attorney, Agent, or Firm* — Carrier Blackman & Associates, P.C.; Joseph P. Carrier; William D. Blackman

(57) ABSTRACT

The purpose of the present invention is to provide: an electric double-layer capacitor, a lithium ion secondary battery, and a lithium ion capacitor, each of which has excellent cycle characteristics; an electrode material which is capable of providing the electric double-layer capacitor, the lithium ion secondary battery, and the lithium ion capacitor; and a composite which is used in the electrode material. The composite of the present invention is a composite produced by compositing from 0.5 to 5 parts by mass of nitrogen atom-containing conductive polymer per 100 parts by mass of porous carbon material. The composite of the present invention is a composite where the peak area ratio (nitrogen/carbon ratio) of peak area derived from nitrogen atoms to peak area derived from carbon atoms in the spectrum by X-ray photoelectron spectroscopy becomes 0.005 to 0.05.

24 Claims, No Drawings

CONDUCTIVE POLYMER/POROUS CARBON MATERIAL COMPOSITE AND ELECTRODE MATERIAL USING SAME

TECHNICAL FIELD

The present invention relates to a conductive polymer/porous carbon material composite, an electrode material using the same, as well as an electric double-layer capacitor, lithium ion secondary battery, and lithium ion capacitor.

BACKGROUND ART

Lithium ion secondary batteries and electric double-layer capacitors are known as electrical storage devices.

Generally, in comparison to the electric double-layer capacitor, the lithium ion secondary battery has higher energy density and is capable of operation over a longer time interval.

On the other hand, in comparison to the lithium ion secondary battery, the electric double-layer capacitor is capable of rapid electrical charging and discharging, and working life over repeated uses is longer.

Moreover, in recent years, a lithium ion capacitor has been developed as an electrical storage device that combines such respective advantages of the lithium ion secondary battery and the electric double-layer capacitor.

For example, for an electric double-layer capacitor, the applicant of the present application in Patent Document 1 provides "an electrode material for an electric double-layer capacitor using a polyaniline/carbon composite produced by forming a composite of polyaniline or a derivative thereof and a carbonaceous material selected from the group consisting of activated carbon, Ketjen black, acetylene black, and furnace black, where the polyaniline or a derivative thereof is dedoped by base treatment of conductive polyaniline or a derivative thereof dispersed in a nonpolar organic solvent." The applicant of the present application in Patent Document 2 provides "a polyaniline/porous carbon composite produced by forming a composite of porous carbon material and conductive polyaniline or a derivative thereof dispersed in a doped state in a nonpolar organic solvent."

Moreover, for a lithium ion capacitor, the applicant of the present application in Patent Document 3 proposes "an electric double-layer capacitor including (i) a positive electrode, (ii) a negative electrode containing such active material as can reversibly absorb and release the lithium ion, and (iii) an electrolyte solution comprising an aprotic organic solvent containing a lithium salt supporting electrolyte. In such an electric double-layer capacitor, the positive electrode contains a collector and electrode active material, using an conductive polyaniline/porous carbon composite produced by forming a composite of an conductive polyaniline or a derivative thereof dispersed in a doped state in a nonpolar organic solvent and porous carbon material as active material, as well as an electric conduction auxiliary agent and a binding agent as may be required."

On the other hand, Patent Document 4 describes "an electric double-layer capacitor composed of a polarizable electrode immersed in an electrolyte solution, wherein an electrolyte solution is used that includes an electropolymerizable polymer precursor as an additive at 0.005 to 0.05 M concentration; by performing initial charging, the electropolymerizable polymer precursor contained in the electrolyte solution undergoes electropolymerization; the polymer generated by the electropolymerization precipitates at electrochemically active sites present on the positive electrode-side polarizable electrode surface; and the electrochemically active sites are coated by the polymer."

PRIOR ART DOCUMENTS

Patent Documents

Patent Document 1: Japanese Patent No. 4294067
Patent Document 2: Japanese Unexamined Patent Application Publication No. 2008-072079
Patent Document 3: Japanese Unexamined Patent Application Publication No. 2008-300639
Patent Document 4: Japanese Unexamined Patent Application Publication No. 2010-205870

SUMMARY OF THE INVENTION

Problems to be Solved by the Invention

As a result of investigation of the electrode materials and polyaniline/porous carbon composites described in Patent Documents 1 to 3, the inventors of the present invention found that great differences occurred in cycle characteristics, particularly in the capacitance maintenance ratio after 1,000 cycles of charge-discharge testing versus initial capacitance, due to factors such as the polyaniline molecular weight, concentration of the polyaniline dispersion used for preparation of the composite, use or non-use of dedoping, the dedoping procedure, combinations of such factors, or the like.

Moreover, the inventors of the present invention performed investigations concerning the electric double-layer capacitor described in Patent Document 4. As a result of such investigations, it was made clear that traces of unreacted monomer or low molecular weight compounds remaining in the electrolyte solution after electropolymerization cause side reactions with the electrolyte solution, obstruct pores of the carbon material, or the like so that the cycle characteristics worsen.

Thus the object of the present invention is to provide an electric double-layer capacitor, lithium ion secondary battery, and lithium ion capacitor (hereinafter collectively referred to as the "electric double-layer capacitor or the like"), and an electrode material and composite used as an electrode material that may be used to obtain the electric double-layer capacitor or the like that has excellent cycle characteristics.

Means to Solve the Problem

As a result of dedicated investigations, the inventors of the present invention achieved the present invention by discovery of the ability to obtain an electric double-layer capacitor or the like having excellent cycle characteristics by use of a composite obtained by compositing a specific amount of conductive polymer having a nitrogen atom with a porous carbon material, the composite having a specific range of peak area ratio (nitrogen/carbon ratio) of nitrogen atom to carbon atom in a spectrum measured by X-ray photoelectron spectroscopy. Specifically, the present invention provides the following (1) to (8).

(1) A composite formed by compositing from 0.5 to 5 parts by mass of a conductive polymer having nitrogen atoms per 100 parts by mass of a porous carbon material;
a ratio of peak area derived from nitrogen atoms to peak area derived from carbon atoms (nitrogen/carbon ratio) in the spectrum by X-ray photoelectron spectroscopy being from 0.005 to 0.05.

(2) The composite according to (1); wherein number average molecular weight of the conductive polymer is from 2,000 to 20,000.

(3) The composite according to (1) or (2); wherein the conductive polymer is at least one selected from the group consisting of polyaniline, polypyrrole, polypyridine, polyquinoline, polythiazole, polyquinoxaline, and derivatives thereof.

(4) The composite according to any one of (1) to (3); wherein the porous carbon material is activated carbon and/or graphite.

(5) An electrode material comprising the composite described in any one of (1) to (4).

(6) An electric double-layer capacitor comprising a polarizable electrode using the electrode material described in (5).

(7) A lithium ion secondary battery having a negative electrode comprising the electrode material described in (5).

(8) A lithium ion capacitor having a positive electrode and/or a negative electrode comprising the electrode material described in (5).

Effect of the Invention

As described below, the present invention is capable of providing an electric double-layer capacitor or the like that has excellent cycle characteristics, an electrode material capable of obtaining the electric double-layer capacitor or the like, and a composite used for the electrode material.

BEST MODE FOR CARRYING OUT THE INVENTION

[Composite]

The composite of the present invention is a composite formed by compositing from 0.5 to 5 parts by mass of a conductive polymer containing nitrogen atoms per 100 parts by mass of porous carbon material, where the ratio (nitrogen/carbon ratio) of peak area derived from nitrogen atoms to peak area derived from carbon atoms in a spectrum (also referred to hereinafter as the "XPS spectrum") by X-ray photoelectron spectroscopy (also referred to hereinafter as "XPS") is from 0.005 to 0.05.

The expression "composite" generally means a material resulting from compositing and integration, i.e. by combining two or more materials. However, for the present invention, the conductive polymer having a nitrogen atom is in a state (referred to hereinafter as the "composited state") where at least part of the conductive polymer having a nitrogen atom bonds to the surface of the porous carbon material, and at least part of the conductive polymer having a nitrogen atom is adsorbed in the interior of the pores of the porous carbon material.

Furthermore, the expression "bound to a surface of the porous carbon material" means that chemical bonds are formed by reaction (acid-base reaction) between the nitrogen atom of the conductive polymer (an amino group or imino group) and acidic functional groups of the surface of the porous carbon material, as exemplified by the hydroxyl group, carboxy group, or the like.

Moreover, the "mass (of the conductive polymer relative to the porous carbon material)" means the amount of conductive polymer composing the composite.

The mass may be determined by calculation of mass of the porous carbon material before and after compositing, by calculation from the added amount of conductive polymer relative to the mass of the porous carbon material, or the like, for example. Furthermore, mass may be detected based on temperature and amount of mass loss determined by thermogravimetric analysis (TGA), and may be further calculated based on elemental analysis of the composite. Thermogravimetric analysis may be performed based on JIS K 7210:1999 "Testing Methods of Plastics by Thermogravimetry." Specifically, prior to testing, the porous carbon material is vacuum dried for 2 hours at 200° C., and then the porous carbon material is allowed to sit under vacuum until the temperature of the porous carbon material reaches room temperature (i.e. 23±2° C.). Thereafter, the sample is set in a TGA apparatus. Then, the amount of decomposition can be estimated by measurement while heating up to 700° C. at a heat-up rate of 20° C./minute while feeding nitrogen at a flow rate of 100 mL/minute. Although partial carbonization is thought to occur in the case of a conductive polymer, the decomposition behavior and degree of carbonization differ according to the type of the conductive polymer. It is thus possible to estimate the amount of the composited conductive polymer based on such behavior of the conductive polymer. Furthermore, if the type of the conductive polymer is known, then it becomes possible to estimate the amount of the conductive polymer in the same manner as the estimate based on elemental analysis.

Further, the expression "XPS spectrum" refers to a spectrum measured using X-ray photoelectron spectroscopy. The expression "peak area derived from carbon atoms" and the expression "peak area derived from nitrogen atoms" refer to the respective peak area calculated from the spectrum measured under the following conditions.

X-ray source: monochromatic Al Kα (1,486.6 eV)
X-ray beam diameter: 100 μm
X-ray intensity: 12.5 W, 15 kV
Pass energy: 69 eV (same for each element)
Measured elements: C1s, N1s, and O1s In the present invention, the mass of the conductive polymer is from 0.5 to 5 parts by mass per 100 parts by mass of the porous carbon material, and the ratio of peak area derived from nitrogen atoms to peak area derived from carbon atoms (nitrogen/carbon ratio) by the XPS spectrum is from 0.005 to 0.05. Thus the resultant composite (i.e. electrode material) is capable of use for obtaining an electric double-layer capacitor or the like having excellent cycle characteristics.

This capability is thought to be due to the conductive polymer not being localized just at the surface of the porous carbon material, but rather also existing in the interior of pores of the porous carbon material where detection is difficult by XPS, so that it is possible to react with solvents to suppress the generation of deactivated radicals.

Moreover, in the present invention, in order to have an interactive effect on acidic functional groups present on the surface of the porous carbon material, to avoid blocking the 0.5 to 2 nm diameter pores in the porous carbon material that contribute to the electrostatic capacitance, and to not impede adsorption (incorporation) of the support salt present in the electrolyte, relative to 100 parts by mass of the porous carbon material, the mass content of the conductive polymer is preferably from 1.0 to 4.5 parts by mass, and more preferably is from 1 to 3 parts by mass.

Furthermore, in the present invention, in order to have an interactive effect on acidic functional groups present on the surface of the porous carbon material, to avoid blocking the pores of the porous carbon material, and to not impede adsorption (incorporation) of the support salt present in the electrolyte, the ratio (nitrogen/carbon ratio) in the XPS spectrum is preferably from 0.01 to 0.03, and more preferably is from 0.01 to 0.02.

In the composite of the present invention, total pore volume of all pores having a pore diameter of 0.5 to 100.0 nm as measured by the Horvath-Kawazoe method and BJH method is preferably from 0.3 to 3.0 $cm^3/g$, the fraction of pore volume of pores having a diameter greater than or equal to 2.0 nm and less than 20.0 nm as measured by the BJH method (referred to hereinafter as "mesopores") is preferably less than or equal to 15% relative to the total pore volume, and the fraction of pore volume of pores having a diameter greater than or equal to 0.5 nm and less than 2.0 nm as measured by the Horvath-Kawazoe method and BJH method (referred to hereinafter as "micropores") is preferably greater than or equal to 80% relative to the total pore volume.

Due to the total pore volume, the pore volume proportion of the mesopores, and the pore volume proportion of the micropores satisfying the aforementioned ranges, it is possible to obtain an electric double-layer capacitor that has high electrostatic capacitance and further improved cycle characteristics.

This ability is thought to be due to the mesopores having a size capable of allowing diffusion without sterically inhibiting solvated ions, due to the micropores greatly contributing to electrostatic capacitance and supporting absorption of ions, and due to the ability to suppress deterioration originating at free acidic functional groups present on the surface of the porous carbon material.

Here, the expression "Horvath-Kawazoe method" refers to the method for calculation of pore volume of small pores of diameters from 0.5 nm to 1 nm (J. Chem. Eng. Jpn., 1983, vol. 16, p. 470). The expression "BJH method" refers to the method for determination of the distribution of pore volume of cylindrically shaped pore diameters (1 nm to 100.0 nm) according to the Barrett-Joyner-Halenda standard model (J. Amer. Chem. Soc., 1951, vol. 73, pp. 373 to 377).

The expression "all of the pores" is taken to mean all of the pores having diameters of 0.5 to 100.0 nm, and the expression "total pore volume" is taken to mean the total value of pore volumes of all of the pores.

The conductive polymer and the porous carbon material used for production of the composite of the present invention, the method of production of the composite of the present invention utilizing such, and the like will be described in detail.

<Conductive Polymer>

No particular limitation is placed on the conductive polymer used for production of the composite of the present invention as long as the conductive polymer has nitrogen atoms and displays electrical conductivity by introduction of a dopant. The polymer may be doped by a dopant or may be a polymer obtained by dedoping of such a polymer, as exemplified by a P-type or an N-type conductive polymer having a conductivity of greater than or equal to $10^{-9}$ $Scm^{-1}$.

Specific examples of such P-type conductive polymers include polyaniline, polypyrrole, and derivatives of such. One of these may be used alone, or two or more may be used in combination.

Specific examples of such N-type conductive polymers include polypyridine, polyquinoline, polythiazole, polyquinoxaline, and derivatives of such. One of these may be used alone, or two or more may be used in combination.

Among such conductive polymers, polyaniline, polypyridine, and derivatives thereof are preferred due to low cost of the raw materials and ease of synthesis.

Here, the derivative of polyaniline is exemplified by polymers obtained by polymerization of an aniline derivative (monomer) substituted at a non-4th position of aniline with at least one substituent such as an alkyl group, alkenyl group, alkoxy group, alkylthio group, aryl group, aryloxy group, alkylaryl group, arylalkyl group, or alkoxyalkyl group.

Similarly, the derivative of polypyridine is exemplified by polymers obtained by polymerization of a pyridine derivative (monomer) substituted at the 3rd position, 4th position, and 6th position with at least one substituent such as an alkyl group, alkenyl group, alkoxy group, alkylthio group, aryl group, aryloxy group, alkylaryl group, arylalkyl group, and alkoxyalkyl group.

The polyaniline, polypyrrole, or derivative thereof of the present invention (referred to collectively hereinafter as "polyaniline or the like") may be produced as a dispersion of the polyaniline or the like by chemical polymerization of the corresponding monomer (aniline, pyrrole, or derivative thereof; referred to collectively hereinafter as "aniline or the like") in a nonpolar solvent.

Moreover, the dispersion of polyaniline or the like may be prepared, for example, by oxidative polymerization of aniline or the like in a nonpolar solvent containing a dopant. However, from the standpoint of setting the content of the conductive polymer in the obtained composite of the present invention in the aforementioned range, and from the standpoint of setting the ratio (nitrogen/carbon ratio) in the XPS spectrum in the aforementioned range, it is important to adjust the concentration of doped polyaniline or the like in the dispersion and to adjust the number average molecular weight of the polyaniline or the like used in the below described compositing with the porous carbon material.

Concentration of doped state polyaniline or the like in the dispersion is preferably from 0.1 to 3 mass %, more preferably is from 0.1 to 1.0 mass %, and further preferably is from 0.1 to 0.5 mass %.

The number average molecular weight of the polyaniline or the like used in the below described compositing with the porous carbon material is preferably 2,000 to 20,000, more preferably is 3,000 to 15,000, and further preferably is 5,000 to 10,000 in order not to elute into the electrolyte solution during charging and discharging, and in order not to block the pores.

Here, the number average molecular weight is measured by dedoping by a method such as treatment using a base, thereafter recovering the polyaniline or the like as a precipitate, and then measuring number average molecular weight by gel permeation chromatography (GPC). The number average molecular weight refers to the value in terms of polystyrene of a known molecular weight. In the present invention, the number average molecular weight of the doped polyaniline or the like in the dispersion is understood to be the same as that measured by this procedure.

Adjustment of the number average molecular weight of the doped state polyaniline or the like in the dispersion may be performed according to the amount of a molecular weight adjustment agent (i.e. terminal sealing agent). Specifically, in the polymerization of the polyaniline or the like, the added amount of the molecular weight adjustment agent (i.e. terminal sealing agent) is preferably from 0.1 to 1 equivalents relative to the aniline or the like.

On the other hand, the polypyridine, polyquinoline, polythiazole, polyquinoxaline, or derivative thereof (referred to hereinafter collectively as the "polypyridine or the like") may be produced as a dispersion of polypyridine or the like by dehalogenation polycondensation of the corresponding monomer in an aprotic or nonpolar solvent.

Examples of methods for preparation of the dispersion of the polypyridine or the like include: a method of preparation by dissolving and dispersing the polypyridine or the like in an organic acid such as formic acid or the like; a method of preparation by mixing a solution of the polypyridine or the like dissolved in an organic acid such as formic acid or the like and a solution of a dissolved polymer having an acidic group (e.g. polystyrene sulfonate or the like); a method of preparation by dissolving and dispersing the polypyridine or the like in an organic acid (e.g. formic acid or the like) containing a dissolved polymer having acidic groups (e.g. polystyrene sulfonate or the like); or the like.

The values of concentration of polypyridine or the like in the dispersion, the number average molecular weight of the polypyridine or the like during compositing with the below described porous carbon material, and the utilized amount of the molecular weight adjustment agent during polymerization are similar to those of the polymerization of polyaniline or the like.

Any of the dopants or oxidation agents, molecular weight adjustment agents, phase transfer catalysts, or the like for chemical polymerization (oxidative polymerization) described in Patent Document 1 may be used as such components for the present invention.

<Porous Carbon Material>

No particular limitation is placed on the specific surface area of the porous carbon material used in the production of the composite of the present invention. However, the carbon material preferably has a specific surface area of 1,000 to 3,000 $m^2/g$ from the standpoint of setting the conductive polymer content in the composite of the present invention in the aforementioned range, and from the standpoint of setting the ratio (nitrogen/carbon ratio) in the XPS spectrum in the aforementioned range.

Specific examples of the porous carbon material include activated carbon, graphite, boron-containing porous carbon material, nitrogen-containing porous carbon material, or the like. One of these may be used alone, or two or more may be used in combination.

Of these, the activated carbon and/or graphite is preferable because it is readily acquirable.

The activated carbon is not particularly limited, and conventional activated carbon particles that are used in carbon electrodes and the like can be used. Specific examples include activated carbon particles formed by activating coconut shell, wood dust, petroleum pitch, phenolic resins, and the like using water vapor, various chemicals, alkali, and the like. One of these may be used alone, or two or more may be used in combination.

Moreover, no particular limitation is placed on the graphite, and any known graphite may be utilized that is used as the lithium ion secondary battery negative electrode active material or the like. Specific examples of such graphite include natural graphite, artificial graphite, graphitized meso-carbon micro beads, graphitized mesophase pitch carbon fibers, or the like. One of these may be used alone, or two or more may be used in combination.

<Method of Production of the Composite>

The below-described method may be cited as an example method for the production of the composite of the present invention using the conductive polymer and porous carbon material.

Specifically, after the conductive polymer and porous carbon material are mixed together, the dopant may be removed by dedoping to form the composite of the conductive polymer and porous carbon material.

No particular limitation is placed on the method of mixing the conductive polymer and porous carbon material. Specific examples of methods of mixing the conductive polymer and porous carbon material include: for example, a method of mixing together the entire amount of porous carbon material with a dispersion of the conductive polymer; a method of preparing a pre-composite by mixing a dispersion of the conductive polymer with part of the porous carbon material, and thereafter mixing the pre-composite with the remaining porous carbon material; or the like.

Preferred methods for dedoping include: a method of dedoping the doped conductive polymer, and performing base treatment capable of neutralizing the dopant; a method of heat treatment of the dopant at a temperature that does not destroy the conductive polymer; or the like.

Among such preferred methods of dedoping, dedoping by heat treatment is preferred due to non-use of chemical reagents and organic solvents, completion of treatment in a short time interval due to the lack of need for a base reaction, and lack of salt residue and lack of the need for a washing step to wash out the salt after reaction. Dedoping by heat treatment is excellent for industrial application due to such reasons.

Specific examples of the base treatment include: a method using a basic substance to treat the composite or a dispersion (mixed dispersion) obtained by mixing the conductive polymer and the porous carbon material; a method of mixing the mixed dispersion or the composite with water and/or organic solvent in which the basic substance is dissolved; a method of causing contact between the mixed dispersion or composite with a gas of the basic substance; or the like.

The basic substance includes, for example, ammonia water, sodium hydroxide, potassium hydroxide, lithium hydroxide, magnesium hydroxide, calcium hydroxide and other metal hydroxides; methylamine, ethylamine, triethylamine and other amines; tetramethyl ammonium hydroxide, tetraethyl ammonium hydroxide, and other alkyl ammonium hydroxides; hydrazine, phenyl hydrazine and other hydrazine compounds; diethyl hydroxylamine, dibenzyl hydroxylamine and other hydroxylamine compounds, and the like.

Moreover, the organic solvent may be any organic solvent that dissolves the basic substance. Specific examples of the organic solvent include aromatic hydrocarbons such as toluene, xylene, or the like; aliphatic hydrocarbons such as hexane, heptane, cyclohexane, or the like; halogenated hydrocarbons such as chloroform, dichloromethane, or the like; esters such as ethyl acetate, butyl acetate, or the like; alcohols such as methanol, ethanol, or the like; sulfoxides such as dimethyl sulfoxide or the like; amides such as dimethyl formamide or the like; carbonic acid esters such as propylene carbonate, dimethyl carbonate, diethyl carbonate, or the like; lactones such as γ-butyrolactone, γ-valerolactone, or the like; nitriles such as acetonitrile, propionitrile, or the like; N-methyl-2-pyrrolidone; or the like.

The heat treatment is performed at a temperature selected appropriately for decomposition and removal of the dopant alone without particularly harming the properties of the conductive polymer. For example, the heat treatment is preferably performed at least 20° C. below the decomposition temperature of the conductive polymer as measured by thermogravimetric analysis. Specifically, heat treatment is more preferably performed at a temperature of greater than or equal to 250° C. and less than 400° C.

The composite of the present invention is preferably formed by using the base treatment for dedoping the dopant in the conductive polymer, although it is also permissible to use as the conductive polymer that has not been entirely dedoped.

The amount of dopant contained in the conductive polymer after base treatment, as indicated by mol ratio per monomer unit of the conductive polymer, is preferably from 0 to 0.3, and more preferably is from 0 to 0.1.

A conventional mixing apparatus may be used for preparation of the mixture of the conductive polymer and the porous carbon material, as exemplified by mixing-dispersing equipment such as a sand mill, bead mill, ball mill, planetary ball mill, three-roll mill, colloid mill, ultrasonic homogenizer, Henschel mixer, jet mill, planetary mixer, or the like.

[Electrode Material]

The electrode material of the present invention is an electrode material that utilizes the composite of the present invention as the active material. Specifically, the electrode material of the present invention may be used as the material of the polarizable electrode of the below-descried electric double-layer capacitor of the present invention, as the material of the negative electrode of a lithium ion secondary battery, and as the positive and/or negative electrode materials of a lithium ion capacitor.

[Electric Double-Layer Capacitor]

The electric double-layer capacitor of the present invention is an electric double-layer capacitor that has a polarizable electrode formed using the electrode material of the present invention.

[Lithium Ion Secondary Battery]

The lithium ion secondary battery of the present invention is a lithium ion secondary battery that has a negative electrode formed using the electrode material of the present invention.

[Lithium Ion Capacitor]

The lithium ion capacitor of the present invention is a lithium ion capacitor that has a positive and/or a negative electrode formed using the electrode material of the present invention.

The polarizable electrode, positive electrode, and negative electrode in the electric double-layer capacitor, lithium ion secondary battery, and lithium ion capacitor of the present invention (referred to hereinafter as the "electric double-layer capacitor or the like of the present invention"), for example, may be constituted by the composite of the present invention and a collector (e.g. platinum, copper, nickel, aluminum, or the like).

Although a binding agent or conductivity aid are not necessarily needed because the polarizable electrode includes the conductive polymer, a binding agent or conductivity aid may be used as may be required. If a binding agent or conductivity aid is used, the electrode material of the present invention may use the binding agent or conductivity aid together with the conductive polymer and porous carbon material.

Specific examples of the binding agent include polyvinylidene fluoride, polytetrafluoroethylene, fluoroolefin copolymers, carboxymethyl cellulose, polyvinyl alcohol, polyacrylic acid, polyvinylpyrrolidone, polymethyl methacrylate, or the like.

Specific examples of the conductivity aid include carbon black (particularly acetylene black and Ketjen black), natural graphite, thermal expandable graphite, carbon fibers, nanocarbon material, ruthenium oxide, metal fiber (e.g. aluminum, nickel, or the like), or the like.

In addition to the electrode material (composite) of the present invention used as the polarizable electrode, a conventional known structure may be adopted for the electric double-layer capacitor or the like of the present invention, and the electric double-layer capacitor or the like of the present invention may be manufactured by conventional known production methods.

EXAMPLES

The present invention will now be described in greater detail using the following examples, but is in no way restricted to these examples.

<Preparation of Polyaniline Toluene Dispersion 1>

1.2 g of aniline, 2.6 g of dodecyl benzenesulfonic acid, and 0.26 g of 2,4,6-trimethylaniline (0.15 equivalent relative to the aniline) as a molecular weight adjustment agent (terminal sealing agent) were dissolved in 200 g of toluene. Thereafter, to this mixture was added 100 g of distilled water into which was dissolved 2.2 mL of 6N hydrochloric acid.

To the mixed solution, 0.36 g of tetrabutyl ammonium bromide was added, the mixture was cooled to 5° C. or less, then 80 g of distilled water, in which 3.52 g of ammonium persulfate was dissolved, was added.

The mixture was oxidatively polymerized in a state of 5° C. or less for 6 hours, then 100 g of toluene, then a methanol-water mixed solvent (water/methanol=2/3 (mass ratio)) were added thereto, and the resultant mixture was stirred.

After the end of stirring, the reaction solution was separated into the toluene layer and the aqueous layer, and only the aqueous layer was removed so as to obtain a polyaniline toluene dispersion 1.

Part of the polyaniline toluene dispersion 1 was sampled, and the toluene was removed by vacuum distillation to determine solids content of the dispersion as 1.2% by mass (polyaniline content=0.4% by mass, polyaniline number average molecular weight=7,800).

Moreover, there was no plugging when this dispersion was filtered through a 1.0 μm pore diameter filter. The polyaniline particle diameter in the dispersion was analyzed using an ultrasonic particle size distribution measurement apparatus (APS-100, manufactured by Matec Applied Sciences). The polyaniline particles were found to be monodispersed (peak value=0.19 μm, half-value width=0.10 μm).

Further, this dispersion did not agglomerate or precipitate even after the elapse of 1 year at room temperature, and thus was stable. From the elemental analysis, the molar ratio of the dodecyl benzenesulfonic acid per aniline monomer unit was 0.45. The yield of the polyaniline obtained was 95%.

<Preparation of Polyaniline Toluene Dispersion 2>

Polyaniline toluene dispersion 2 was obtained by polymerization by the same method as that of the polyaniline toluene dispersion 1 except for use of 0.52 g of 2,4,6-trimethylaniline (0.30 equivalents relative to the aniline).

Part of the polyaniline toluene dispersion 2 was sampled, and the toluene was removed by vacuum distillation to determine solids content of the dispersion as 1.4% by mass (polyaniline content=0.4% by mass, polyaniline number average molecular weight=5,600).

Moreover, there was no plugging when this dispersion was filtered through a 1.0 μm pore diameter filter. The polyaniline particle diameter in the dispersion was analyzed using an ultrasonic particle size distribution measurement apparatus (APS-100, manufactured by Matec Applied Sciences). The polyaniline particles were found to be monodispersed (peak value=0.14 μm, half-value width=0.08 μm).

Further, this dispersion did not agglomerate or precipitate even after the elapse of 1 year at room temperature, and thus was stable. From the elemental analysis, the molar ratio of the dodecyl benzenesulfonic acid per aniline monomer unit was 0.45. The yield of the polyaniline obtained was 93%.

<Preparation of Polyaniline Toluene Dispersion 3>

Polyaniline toluene dispersion 3 was obtained by polymerization by the same method as that of the polyaniline toluene dispersion 1 except for use of 0.52 g of 2,4,6-trimethylaniline (0.20 equivalents relative to the aniline).

Part of the polyaniline toluene dispersion 3 was sampled, and the toluene was removed by vacuum distillation to determine solids content of the dispersion as 1.4% by mass (polyaniline content=0.4% by mass, polyaniline number average molecular weight=6,500).

Moreover, there was no plugging when this dispersion was filtered through a 1.0 μm pore diameter filter. The polyaniline particle diameter in the dispersion was analyzed using an ultrasonic particle size distribution measurement apparatus (APS-100, manufactured by Matec Applied Sciences). The polyaniline particles were found to be monodispersed (peak value=0.10 μm, half-value width=0.07 μm).

Further, this dispersion did not agglomerate or precipitate even after the elapse of 1 year at room temperature, and thus was stable. From the elemental analysis, the molar ratio of the dodecyl benzenesulfonic acid per aniline monomer unit was 0.45. The yield of the polyaniline obtained was 93%.

<Preparation of Polypyridine Aqueous Dispersion>

To 50 g of dry dimethyl formamide were dissolved 5 g of 2,5-dibromopyridine, 0.5 g of 2-bromopyridine as a molecular weight adjustment agent (0.15 equivalents relative to the pyridine monomer), 9 g of bis(1,5-cyclooctadiene) nickel as a polycondensation agent. Thereafter, the polymerization reaction was performed for 16 hours at 60° C. under nitrogen.

After completion of the reaction, polypyridine was purified by the below-described operation.

Firstly, the reaction solution was poured into 200 mL of 0.5 mol/L hydrochloric acid aqueous solution. After stirring for 2 hours at room temperature, the precipitate was filtered out and recovered.

Thereafter, the recovered precipitate was stirred again in 200 mL of 0.5 mol/L hydrochloric acid aqueous solution for 8 hours at room temperature, and the precipitate was filtered out and recovered.

Thereafter, the recovered precipitate was stirred in 200 mL of 0.1 mol/L ammonium aqueous solution for 3 hours at room temperature to isolate and purify the polypyridine.

The obtained polypyridine powder was dried under vacuum. 1.72 g was recovered (92% yield).

A polypyridine formic acid solution was prepared beforehand by dissolving 0.8 g of polypyridine powder in 9.2 g of 88% formic acid. This polypyridine formic acid solution and 15 g of 18% polystyrene sulfonate aqueous solution were mixed and stirred. Thereafter, 175 g of distilled water was added to prepare a polypyridine aqueous dispersion (polypyridine content=0.4 mass %; polypyridine number average molecular weight=10,000).

The particle size of the polypyridine particles in the dispersion was analyzed by an ultrasonic particle size distribution measurement apparatus (manufactured by Matec Applied Sciences, APS-100). As a result, it was learned that the particle size distribution was a mono-dispersion (i.e., the peak value of 0.25 μm, the half width of 0.12 μm).

<Preparation of Polypyrrole Dispersion>

To 150 g of toluene were dissolved 3 g of pyrrole, 12.0 g of dodecyl benzenesulfonic acid, and 0.15 g of 2-methyl pyrrole as a molecular weight adjustment agent (terminal sealing agent). Thereafter, 75 g of distilled water was added into which had been dissolved 5.36 mL of 6N hydrochloric acid.

To this mixed solvent, 0.9 g of tetrabutyl ammonium bromide was added. After performing oxidative polymerization for 6 hours at temperatures below or equal to 0° C., 100 g of toluene and then methanol/water mixed solvent (methanol:water=2:3 (mass ratio)) were added, and the mixture was stirred.

After the end of stirring, the reaction solution was separated into the toluene layer and the aqueous layer, and only the aqueous layer was removed so as to obtain a polypyrrole toluene dispersion.

Part of the polypyrrole toluene dispersion was sampled, and the toluene was removed by vacuum distillation to determine solids content of the dispersion as 4.1% by mass (pyrrole content=1.2% by mass, polypyrrole number average molecular weight=10,000). Further, this dispersion was filtered by a filter having a pore size of 1.0 μm, whereupon there was no clogging. Further, this dispersion did not agglomerate or precipitate even after the elapse of 1 year at room temperature, and thus was stable. From the elemental analysis, the molar ratio of the dodecyl benzenesulfonic acid per anion monomer unit was 0.95. The yield of the polypyrrole obtained was 94%.

<Polyaniline Xylene Dispersion>

A commercially available polyaniline xylene dispersion was used (NX-B001, polyaniline content=1.0% by mass, polyaniline number average molecular weight=1,500, produced by Ormecon).

Preparation of Composite 1

To 250 g of the polyaniline toluene dispersion 1 (a polyaniline content=1 g) was added 89 g of activated carbon (NK260, specific surface area=2,000 $m^2/g$, acidic functional group content=0.1 mmol, produced by Kuraray Chemical Co., Ltd.) to obtain a mixed dispersion.

To the mixed dispersion, 50 mL of a 2 mol/L triethylamine in methanol solution was added, then the mixture was stirred and mixed for 5 hours.

After the end of the stirring, the precipitate was recovered by filtration and washed with methanol. The filtrate and the washed solution at this time were colorless and transparent.

The washed and purified precipitate was dried under vacuum to prepare a polyaniline/activated carbon composite (referred to hereinafter as the "composite 1").

The content of conductive polymer per 100 parts by mass of the porous carbon material was determined for the obtained composite 1. The ratio (nitrogen/carbon ratio) of the peak area derived from nitrogen atoms to the peak area derived from carbon atoms in the XPS spectrum measured using an X-ray photoelectron spectrometer (model: Quanter SMX, manufactured by ULVAC-PHI, Inc.) was calculated for the obtained composite 1. These results are shown below in Table 1. In Table 1, the numerical values within parentheses for contents within the respective dispersions indicate the content of the conductive polymer in the dispersion.

A fast specific surface area/pore distribution measurement apparatus (model ASAP 2020, manufactured by Shimadzu Micromeritics) was used to measure pore volume for the obtained composite 1. Specifically, after the sample was dried for 6 hours at 150° C., nitrogen gas was used as the adsorption gas, and liquid nitrogen was used as the cooling medium. The total pore volumes by the Horvath-Kawazoe method and BJH method were measured, the pore volume for pores having diameters greater than or equal to 2.0 nm and less than 20.0 nm was measured, and the pore volume for pores having diameters greater than or equal to 0.5 nm and less than 2.0 nm was measured. These measured values were used to calculate the pore volume proportions of each pore volume. These results are shown below in Table 1.

Preparation of Composite 2

To 1,000 g of the polyaniline toluene dispersion 1 (a polyaniline content=4 g) was added 86 g of activated carbon (NK260, specific surface area=2,000 $m^2/g$, acidic functional group content=0.1 mmol, produced by Kuraray Chemical Co., Ltd.) to obtain a mixed dispersion.

To the mixed dispersion, 50 mL of a 2 mol/L triethylamine in methanol solution was added, then the mixture was stirred and mixed for 5 hours.

After the end of the stirring, the precipitate was recovered by filtration and washed with methanol. The filtrate and the washed solution at this time were colorless and transparent.

The washed and purified precipitate was dried under vacuum to prepare a polyaniline/activated carbon composite (referred to hereinafter as the "composite 2").

For the obtained composite 2, in the same manner as for the composite 1, the ratio (nitrogen/carbon ratio) of the peak area derived from nitrogen atoms to the peak area derived from carbon atoms by the XPS spectrum and the content of the conductive polymer relative to 100 parts by mass of the porous carbon material were calculated, and each of the pore volume values measured in the same method as that of the composite 1 were used to calculate the pore volume proportions of each pore volume. These results are shown below in Table 1.

Preparation of Composite 3

A polyaniline/activated carbon composite (referred to hereinafter as the "composite 3") was prepared by the same method as that of composite 1 except for use of 250 g of the polyaniline toluene dispersion 2 (a polyaniline content=1 g) rather than the polyaniline toluene dispersion 1.

For the obtained composite 3, in the same manner as for the composite 1, the ratio (nitrogen/carbon ratio) of the peak area derived from nitrogen atoms to the peak area derived from carbon atoms by the XPS spectrum and the content of the conductive polymer relative to 100 parts by mass of the porous carbon material were calculated, and each of the pore volume values measured in the same method as that of the composite 1 were used to calculate the pore volume fractions of each pore volume. These results are shown below in Table 1.

Preparation of Composite 4

A polyaniline/activated carbon composite (referred to hereinafter as the "composite 4") was prepared by the same method as that of composite 1 except for use of 250 g of the polyaniline toluene dispersion 3 (a polyaniline content=1 g) rather than the polyaniline toluene dispersion 1.

For the obtained composite 4, in the same manner as for the composite 1, the ratio (nitrogen/carbon ratio) of the peak area derived from nitrogen atoms to the peak area derived from carbon atoms by the XPS spectrum and the content of the conductive polymer relative to 100 parts by mass of the porous carbon material were calculated, and each of the pore volume values measured in the same method as that of the composite 1 were used to calculate the pore volume proportions of each pore volume. These results are shown below in Table 1.

Preparation of Composite 5

A polypyridine/activated carbon composite (referred to hereinafter as the "composite 5") was prepared by the same method as that of composite 1 except for use of 250 g of the polypyridine aqueous dispersion (a polypyridine content=1 g) rather than the polyaniline toluene dispersion 1.

For the obtained composite 5, in the same manner as for the composite 1, the ratio (nitrogen/carbon ratio) of the peak area derived from nitrogen atoms to the peak area derived from carbon atoms by the XPS spectrum and the content of the conductive polymer relative to 100 parts by mass of the porous carbon material were calculated, and each of the pore volume values measured in the same method as that of the composite 1 were used to calculate the pore volume proportions of each pore volume. These results are shown below in Table 1.

Preparation of Composite 6

93 g of graphite (bulk mesophase graphite, manufactured by JFE Chemical Corp.) was added to 500 g of the polyaniline toluene dispersion 1 (polyaniline content=2 g) to obtain a mixed dispersion.

To the mixed dispersion, 50 mL of a 2 mol/L triethylamine in methanol solution was added, then the mixture was stirred and mixed for 5 hours.

After the end of the stirring, the precipitate was recovered by filtration and washed with methanol. The filtrate and the washed solution at this time were colorless and transparent.

The washed and purified precipitate was dried in vacuum to prepare the polyaniline/graphite composite (referred to hereinafter as the "composite 6").

For the obtained composite 6, in the same manner as for the composite 1, the ratio (nitrogen/carbon ratio) of the peak area derived from nitrogen atoms to the peak area derived from carbon atoms by the XPS spectrum and the content of the conductive polymer relative to 100 parts by mass of the porous carbon material were calculated. These results are shown below in Table 1. Furthermore, pore volume could not be measured for the composite 6 that used graphite as the porous carbon material, and thus the entry in the below Table 1 is marked as "–".

Preparation of Composite 7

A polypyrrole/activated carbon composite (referred to hereinafter as the "composite 7") was prepared in the same manner as for the composite 6 except for use of 167 g of the polypyrrole toluene dispersion (a polypyrrole content=2 g) rather than the polyaniline toluene dispersion 1.

For the obtained composite 7, in the same manner as for the composite 1, the ratio (nitrogen/carbon ratio) of the peak area derived from nitrogen atoms to the peak area derived from carbon atoms by the XPS spectrum and the content of the conductive polymer relative to 100 parts by mass of the porous carbon material were calculated. These results are shown below in Table 1. Furthermore, pore volume could not be measured for the composite 7 that used graphite as the porous carbon material, and thus the entry in the below Table 1 is marked as "–".

Preparation of Composite 8

To 3750 g of the polyaniline toluene dispersion 1 (a polyaniline content=15 g) was added 75 g of activated carbon (NK260, specific surface area=2,000 $m^2/g$, acidic functional group content=0.1 mmol, produced by Kuraray Chemical Co., Ltd.) to obtain a mixed dispersion.

To the mixed dispersion, 50 mL of a 2 mol/L triethylamine in methanol solution was added, then the mixture was stirred and mixed for 5 hours.

After the end of the stirring, the precipitate was recovered by filtration and washed with methanol. The filtrate and the washed solution at this time were colorless and transparent.

The washed and purified precipitate was dried under vacuum to prepare a polyaniline/activated carbon composite (referred to hereinafter as the "composite 8").

For the obtained composite 8, in the same manner as for the composite 1, the ratio (nitrogen/carbon ratio) of the peak area derived from nitrogen atoms to the peak area derived from carbon atoms by the XPS spectrum and the content of the conductive polymer relative to 100 parts by mass of the porous carbon material were calculated, and each of the pore volume values measured in the same method as that of the composite 1 were used to calculate the pore volume proportions of each pore volume. These results are shown below in Table 1.

Preparation of Composite 9

A polyaniline NMP solution (a polyaniline content=0.4 mass %) was prepared by dissolving 0.4 g of commercial product type polyaniline powder (produced by Sigma-Aldrich Co. LLC.; number average molecular weight=3900) in 99.6 g of N-methyl-2-pyrrolidone (NMP).

To 250 g of the polyaniline NMP solution (a polyaniline content=1 g) was added 89 g of activated carbon (NK260, specific surface area=2,000 m²/g, acidic functional group content=0.1 mmol, produced by Kuraray Chemical Co., Ltd.) to obtain a mixed dispersion.

Polyaniline/activated carbon composite (referred to hereinafter as the "composite 9") was prepared by vacuum distillation by heating and removing the NMP from the mixed dispersion.

For the obtained composite 9, in the same manner as for the composite 1, the ratio (nitrogen/carbon ratio) of the peak area derived from nitrogen atoms to the peak area derived from carbon atoms by the XPS spectrum and the content of the conductive polymer relative to 100 parts by mass of the porous carbon material were calculated, and each of the pore volume values measured in the same method as that of the composite 1 were used to calculate the pore volume proportions of each pore volume. These results are shown below in Table 1.

Preparation of Composite 10

To 1,000 g of the polyaniline NMP solution (a polyaniline content=4 g) was added 86 g of activated carbon (NK260, specific surface area=2,000 m²/g, acidic functional group content=0.1 mmol, produced by Kuraray Chemical Co., Ltd.) to obtain a mixed dispersion.

Polyaniline/activated carbon composite (referred to hereinafter as the "composite 10") was prepared by vacuum distillation by heating and removing the NMP from the mixed dispersion.

For the obtained composite 10, in the same manner as for the composite 1, the ratio (nitrogen/carbon ratio) of the peak area derived from nitrogen atoms to the peak area derived from carbon atoms by the XPS spectrum and the content of the conductive polymer relative to 100 parts by mass of the porous carbon material were calculated, and each of the pore volume values measured in the same method as that of the composite 1 were used to calculate the pore volume proportions of each pore volume. These results are shown below in Table 1.

Preparation of Composite 11

To 75 g of the polyaniline NMP solution (a polyaniline content=0.3 g) was added 89.7 g of activated carbon (NK260, specific surface area=2,000 m²/g, acidic functional group content=0.1 mmol, produced by Kuraray Chemical Co., Ltd.) to obtain a mixed dispersion.

Polyaniline/activated carbon composite (referred to hereinafter as the "composite 11") was prepared by vacuum distillation by heating and removing the NMP from the mixed dispersion.

For the obtained composite 11, in the same manner as for the composite 1, the ratio (nitrogen/carbon ratio) of the peak area derived from nitrogen atoms to the peak area derived from carbon atoms by the XPS spectrum and the content of the conductive polymer relative to 100 parts by mass of the porous carbon material were calculated, and each of the pore volume values measured in the same method as that of the composite 1 were used to calculate the pore volume proportions of each pore volume. These results are shown below in Table 1.

Preparation of Composite 12

89 g of activated carbon (NK260, specific surface area=2,000 m²/g, acidic functional group content=0.1 mmol, produced by Kuraray Chemical Co.) was added to 100 g of a polyaniline xylene dispersion (NX-B001, polyaniline content=1.0% by mass, polyaniline number average molecular weight=1,500, produced by Ormecon) to obtain a mixed dispersion.

To the mixed dispersion, 50 mL of a 2 mol/L triethylamine in methanol solution was added, then the mixture was stirred and mixed for 5 hours.

After the end of the stirring, the precipitate was recovered by filtration and washed with methanol. The filtrate and the washed solution at this time were colorless and transparent.

The washed and purified precipitate was dried under vacuum to prepare a polyaniline/activated carbon composite (referred to hereinafter as the "composite 12").

For the obtained composite 12, in the same manner as for the composite 1, the ratio (nitrogen/carbon ratio) of the peak area derived from nitrogen atoms to the peak area derived from carbon atoms by the XPS spectrum and the content of the conductive polymer relative to 100 parts by mass of the porous carbon material were calculated, and each of the pore volume values measured in the same method as that of the composite 1 were used to calculate the pore volume proportions of each pore volume. These results are shown below in Table 1.

Preparation of Composite 13

93 g of graphite (bulk mesophase graphite, produced by JFE Chemical Corp.) was added to and 500 g of the polyaniline NMP solution (polyaniline content=2 g) to obtain a mixed dispersion.

The NMP was removed from the mixed dispersion by heating and vacuum distillation to prepare a polyaniline/graphite composite (referred to hereinafter as the "composite 13").

For the obtained composite 13, in the same manner as for the composite 1, the ratio (nitrogen/carbon ratio) of the peak area derived from nitrogen atoms to the peak area derived from carbon atoms by the XPS spectrum and the content of the conductive polymer relative to 100 parts by mass of the porous carbon material were calculated. These results are shown below in Table 1. Furthermore, pore volume could not be measured for the composite 13 that used graphite as the porous carbon material, and thus the entry in the below Table 1 is marked as "–".

TABLE 1

| | Table 1-1 Composite | | | | | | |
|---|---|---|---|---|---|---|---|
| | 1 | 2 | 3 | 4 | 5 | 6 | 7 |
| Activated carbon | 89 | 86 | 89 | 89 | 89 | — | — |
| Graphite | — | — | — | — | — | 93 | 93 |
| Polyaniline toluene dispersion 1 | 250 | 1000 | — | — | — | 500 | — |
| (a polyaniline content = 0.4 mass %) | (1) | (4) | | | | (2) | |
| Polyaniline toluene dispersion 2 | — | — | 250 | — | — | — | — |
| (a polyaniline content = 0.4 mass %) | | | (1) | | | | |
| Polyaniline toluene dispersion 3 | — | — | — | 250 | — | — | — |
| (a polyaniline content = 0.4 mass %) | | | | (1) | | | |
| Polypyridine aqueous dispersion | — | — | — | — | 250 | — | — |
| (a polypyridine content = 0.4 mass %) | | | | | (1) | | |

TABLE 1-continued

| | | | | | | | |
|---|---|---|---|---|---|---|---|
| Polypyrrole toluene dispersion (a pyrrole content = 1.2 mass %) | — | — | — | — | — | — | 167 (2) |
| Polyaniline NMP solution (polyaniline content = 0.4% by mass) | — | — | — | — | — | — | — |
| parts by mass of conductive polymer per 100 parts by mass of porous carbon material | 1.1 | 4.4 | 1.1 | 1.1 | 1.1 | 2.1 | 2.2 |
| Ratio (nitrogen/carbon ratio) of peak areas in XPS spectrum | 0.012 | 0.032 | 0.019 | 0.010 | 0.015 | 0.016 | 0.021 |
| Total pore volume ($cm^3/g$) (diameter = 0.5 to 100 nm) | 0.81 | 0.71 | 0.75 | 0.85 | 0.78 | — | — |
| Pore volume ($cm^3/g$) (diameter = at least 2.0 nm and less than 20.0 nm) | 0.061 | 0.058 | 0.053 | 0.058 | 0.056 | — | — |
| Pore volume proportion (%) (diameter = at least 2.0 nm and less than 20.0 nm) | 7.5 | 8.1 | 7.1 | 6.8 | 7.2 | — | — |
| Pore volume ($cm^3/g$) (diameter = at least 0.5 nm and less than 2.0 nm) | 0.698 | 0.589 | 0.635 | 0.758 | 0.640 | — | — |
| Pore volume proportion (%) (diameter = at least 0.5 nm and less than 2.0 nm) | 86.2 | 83.0 | 84.7 | 89.2 | 82.1 | — | — |

| | Table 1-1 Composite | | | | | |
|---|---|---|---|---|---|---|
| | 8 | 9 | 10 | 11 | 12 | 13 |
| Activated carbon | 75 | 89 | 86 | 90 | 90 | — |
| Graphite | — | — | — | — | — | 93 |
| Polyaniline toluene dispersion 1 (a polyaniline content = 0.4 mass %) | 3750 (15) | — | — | — | — | — |
| Polyaniline toluene dispersion 2 (a polyaniline content = 0.4 mass %) | — | — | — | — | — | — |
| Polyaniline toluene dispersion 3 (a polyaniline content = 0.4 mass %) | — | — | — | — | — | — |
| Polypyridine aqueous dispersion (a polypyridine content = 0.4 mass %) | — | — | — | — | — | — |
| Polypyrrole toluene dispersion (a pyrrole content = 1.2 mass %) | — | — | — | — | — | — |
| Polyaniline NMP solution (polyaniline content = 0.4% by mass) | — | 250 (1) | 1000 (4) | 75 (0.3) | — | 500 (2) |
| Polyaniline xylene dispersion (polyaniline content = 1.0% by mass) | — | — | — | — | 100 (1) | — |
| parts by mass of conductive polymer per 100 parts by mass of porous carbon material | 16.7 | 1.1 | 4.4 | 0.3 | 1.1 | 2.1 |
| Ratio (nitrogen/carbon ratio) of peak areas in XPS spectrum | 0.081 | 0.087 | 0.149 | 0.027 | 0.056 | 0.107 |
| Total pore volume ($cm^3/g$) (diameter = 0.5 to 100 nm) | 0.56 | 0.15 | 0.03 | 0.49 | 0.62 | — |
| Pore volume ($cm^3/g$) (diameter = at least 2.0 nm and less than 20.0 nm) | 0.141 | 0.009 | 0.002 | 0.048 | 0.058 | — |
| Pore volume proportion (%) (diameter = at least 2.0 nm and less than 20.0 nm) | 25.2 | 6.2 | 6.5 | 9.8 | 9.3 | — |
| Pore volume ($cm^3/g$) (diameter = at least 0.5 nm and less than 2.0 nm) | 0.389 | 0.110 | 0.020 | 0.365 | 0.484 | — |
| Pore volume proportion (%) (diameter = at least 0.5 nm and less than 2.0 nm) | 69.5 | 73.3 | 66.7 | 74.5 | 78.0 | — |

Production of Electrode for Evaluation

Working Examples 1-1 to 1-7, and Comparative Examples 1-1 to 1-8

The composites 1 to 13, the activated carbon or the graphite, conductivity aid (acetylene black) or binder (SBR), and binding agent (carboxymethyl cellulose) were mixed and dispersed at the composition ratios indicated below in Table 2. Then the mixture was further mixed while gradually adding water to produce a paste.

This paste was coated on aluminum collector electrode foil (30 μm thick) to result in 60 μm thickness. Thereafter, the assembly was dried for 24 hours at 150° C. After compression treatment of the sheet-like electrodes at 20 MPa, disk-like samples were cut out (1 cm diameter) to produce evaluation electrodes A to O.

TABLE 3

Table 2-1 Working examples

| | 1-1 | 1-2 | 1-3 | 1-4 | 1-5 | 1-6 | 1-7 |
|---|---|---|---|---|---|---|---|
| Composite 1 | 90 | | | | | | |
| Composite 2 | | 90 | | | | | |
| Composite 3 | | | 90 | | | | |
| Composite 4 | | | | 90 | | | |
| Composite 5 | | | | | 90 | | |
| Composite 6 | | | | | | 95 | |
| Composite 7 | | | | | | | 95 |
| Conductivity aid | 5 | 5 | 5 | 5 | 5 | | |
| Binder | | | | | | 3 | 3 |
| Binding agent | 5 | 5 | 5 | 5 | 5 | 2 | 2 |
| Designation of evaluation electrode | A | B | C | D | E | F | G |

TABLE 4

Table 2-2

| | Comparative examples | | | | | | | |
|---|---|---|---|---|---|---|---|---|
| | 1-1 | 1-2 | 1-3 | 1-4 | 1-5 | 1-6 | 1-7 | 1-8 |
| Activated carbon | 90 | | | | | | | |
| Composite 8 | | 90 | | | | | | |
| Composite 9 | | | 90 | | | | | |
| Composite 10 | | | | 90 | | | | |
| Composite 11 | | | | | 90 | | | |
| Composite 12 | | | | | | 90 | | |
| Graphite | | | | | | | 93 | |
| Composite 13 | | | | | | | | 95 |
| Conductivity aid | 5 | 5 | 5 | 5 | 5 | 5 | 5 | |
| Binder | | | | | | | 2 | 3 |
| Binding agent | 5 | 5 | 5 | 5 | 5 | 5 | | 2 |
| Designation of evaluation electrode | H | I | J | K | L | M | N | O |

Electric Double-Layer Capacitor

Working Examples 2-1 to 2-5, Comparative Examples 2-1 to 2-7

For Working Examples 2-1 to 2-4, the respective evaluation electrodes A to D produced from the composites 1 to 4 were used as the positive electrodes. The evaluation electrode H produced from activated carbon was used as the negative electrode.

In Working Example 2-5, the evaluation electrode H produced from activated carbon was used as the positive electrode, and the evaluation electrode E produced from the composite 5 was used as the negative electrode.

On the other hand, the evaluation electrodes H produced from activated carbon were used as both electrodes in Comparative Example 2-1.

In Comparative Examples 2-2 to 2-6, evaluation electrodes I to M produced from composites 8 to 12, respectively, were used as the positive electrodes; and evaluation electrode H produced from activated carbon was used as the negative electrode.

Further, evaluation electrodes H produced from activated carbon were used as both electrodes in Comparative Example 2-7, and according to Patent Document 4, aniline was dissolved in propylene carbonate solution to give a concentration of 0.03M.

An electric double-layer capacitor was produced using positive and negative electrodes opposed one another through a separator formed from glass fiber (manufactured by Nippon Sheet Glass Co., Ltd.) and using a 1 mol/L tetraethyl ammonium tetrafluoroborate in propylene carbonate solution as the electrolyte solution.

Lithium Ion Secondary Battery

Working Examples 3-1 and 3-2, and Comparative Examples 3-1 and 3-2

The negative electrode used in Working Example 3-1 was evaluation electrode F produced from the composite 6, and the positive electrode was the below described active material (positive electrode active material). The negative electrode used in Working Example 3-2 was evaluation electrode G produced from the composite 7, and the positive electrode was the below described active substance (positive electrode active substance).

The negative electrode used in Comparative Example 3-1 was the evaluation electrode N produced from graphite. The negative electrode used in Comparative Example 3-2 was the evaluation electrode O produced from composite 13. The below listed active material (positive electrode active material) was used as the positive electrode for both Comparative Examples 3-1 and 3-2.

(Positive Electrode Active Material)

10 parts by mass of binder (SBR), 10 parts by mass of conductivity aid (acetylene black), and 10 parts by mass of a binding agent (Teflon (registered trademark)) were added together with ethyl acetate to 100 parts by mass of lithium cobaltate. The mixture was kneaded, and the resultant kneaded mixture was used as the positive electrode active substance.

The positive and negative electrodes opposed one another through a propylene separator (U-Pore, manufactured by Ube Industries, Ltd.). A lithium secondary battery was produced using 1 mol/L lithium hexafluorophosphate diethyl carbonate/ethylene carbonate solution as the electrolyte solution.

Lithium Ion Capacitor

Working Examples 4-1 to 4-3, Comparative Example 4-1

For Working Example 4-1, the evaluation electrode N produced from graphite was used as the negative electrode, and the evaluation electrode A produced from composite 1 was used as the positive electrode.

In Working Example 4-2, the evaluation electrode F produced from the composite 6 was used as the negative electrode, and the evaluation electrode H produced from activated carbon was used as the positive electrode.

In Working Example 4-3, the evaluation electrode F produced from the composite 6 was used as the negative electrode, and the evaluation electrode A produced from composite 1 was used as the positive electrode.

For Comparative Example 4-1, the evaluation electrode N produced from graphite was used as the negative electrode, and the evaluation electrode H produced from activated carbon was used as the positive electrode.

Specifically, firstly the positive and negative electrodes were stacked with the separator therebetween, and the assembly was vacuum dried for 12 hours at 150° C.

Thereafter, a single sheet of separator was placed on the exterior of each electrode, and the 4 sides were hermetically sealed to produce the lithium ion capacitor element.

Thereafter, metallic lithium to provide 350 mAh/g ion concentration doping relative to the mass amount of negative electrode active material was pressure bonded to 70 μm thick copper mesh, and 1 sheet of this material was placed at the outermost part of the lithium ion capacitor element so as to oppose the negative electrode.

After insertion of the lithium ion capacitor element, into which metallic lithium had been placed, in an exterior covering laminate film, the assembly was impregnated under vacuum conditions using an electrolyte solution containing 1.2M $LiPF_6$ dissolved in propylene carbonate.

Thereafter, the exterior covering laminate film was heat sealed under vacuum conditions to assemble the lithium ion capacitor cell.

<Electrostatic Capacitance and Cycle Characteristics>
(Electric Double-Layer Capacitor)

Charge-discharge testing of the produced electric double-layer capacitors was performed using a charge-discharge testing apparatus (HJ1001SM8A, manufactured by Hokuto Denko Corp.). The charging was performed at 60° C. by a constant current of 2 mA. After the voltage reached 3.0 V, the charging was performed by constant voltage charging for 1 hour. The discharging was performed at 60° C. by a constant current of 2 mA and with an end voltage of 0 V.

Charge-discharge testing was repeated 1,000 times. The electrostatic capacitance per positive electrode material in the 1st discharge was taken to be the initial electrostatic capacitance (i.e. electrostatic capacitance per unit weight of the positive electrode), and the electrostatic capacitance maintenance ratio relative to the initial electrostatic capacitance was found. These results are shown below in Table 3.

(Lithium Ion Secondary Battery)

Charge-discharge testing of the produced lithium ion secondary batteries was carried out in the below described manner.

Firstly, the battery was charged using a fixed current of 2 mA until the battery voltage reached 4.2 V. Thereafter, the charging by a fixed current was switched to charging by a fixed voltage of 4.2 V, and charging was completed when the total charging time reached 4 hours.

Thereafter, discharge was performed at a fixed current of 2 mA. Discharge was completed when the battery voltage reached 3.0 V, and the discharge capacitance of the first cycle was measured.

Thereafter, charging-discharging was repeated for 1,000 cycles under the following conditions: 4.2 V upper limit voltage, 3.0 V lower limit voltage, 2 mA discharge current, and 2 mA charge current. The discharge capacitance at this time was then compared to the initial discharge capacitance, i.e. first cycle capacitance, and the capacitance maintenance ratio after 1,000 cycles was calculated. These results are shown below in Table 4.

(Lithium Ion Capacitor)

Charge-discharge testing of the lithium ion capacitor cells was performed using a charge-discharge testing apparatus (HJ1001SM8A, manufactured by Hokuto Denko Corp.).

Specifically, firstly, using a fixed current of 2 mA, the lithium ion capacitor cell was charged until the cell voltage reached 3.8 V. Thereafter, a fixed voltage of 3.8 V was applied for 1 hour, to perform fixed current-fixed voltage charging.

Thereafter, using a fixed current of 2 mA, the cell was discharged until the cell voltage reached 2.2 V.

Thereafter, continuous charging testing was performed for 10,000 hours under 3.8 V cell voltage and 60° C. conditions. The application of voltage was stopped after 10,000 hours had elapsed, and the lithium ion capacitor cell was left for 10 hours at 25° C. Thereafter, a 3.8 V-2.2 V charge-discharge cycle was performed, and the electrostatic capacitance was calculated. The electrostatic capacitance per positive electrode material in the 1st discharge was taken to be the initial electrostatic capacitance (i.e. electrostatic capacitance per unit weight of the positive electrode), and the electrostatic capacitance maintenance ratio was determined relative to the initial electrostatic capacitance. These results are shown below in Table 5.

TABLE 5

Table 3-1 <Electric Double-layer Capacitor>

| | Working examples | | | | |
|---|---|---|---|---|---|
| | 2-1 | 2-2 | 2-3 | 2-4 | 2-5 |
| Positive electrode | A | B | C | D | H |
| Negative electrode | H | H | H | H | E |
| Initial electrostatic capacitance (F/g) | 27.5 | 30.1 | 27.9 | 28.6 | 27.1 |
| Capacitance maintenance ratio after 1,000 cycles versus initial capacitance (%) | 96.2% | 94.1% | 90.2% | 97.7% | 94.6% |

TABLE 6

Table 3-2 <Electric Double-layer Capacitor>

| | Comparative examples | | | | | | |
|---|---|---|---|---|---|---|---|
| | 2-1 | 2-2 | 2-3 | 2-4 | 2-5 | 2-6 | 2-7 |
| Positive electrode | H | I | J | K | L | M | H |
| Negative electrode | H | H | H | H | H | H | H |
| Initial electrostatic capacitance (F/g) | 26.1 | 43.2 | 26.0 | 26.1 | 26.8 | 26.2 | 22.7 |
| Capacitance maintenance ratio after 1,000 cycles versus initial capacitance (%) | 62.9% | 65.7% | 70.4% | 78.3% | 68.5% | 76.5% | 64.8% |

TABLE 7

Table 4 <Lithium Ion Secondary Battery>

|  | Working examples | | Comparative examples | |
| --- | --- | --- | --- | --- |
|  | 3-1 | 3-2 | 3-1 | 3-2 |
| Positive electrode | Lithium cobaltate | | Lithium cobaltate | |
| Negative electrode | F | G | N | O |
| Initial electrostatic capacitance (mAh/g) | 157 | 155 | 158 | 155 |
| Capacitance maintenance ratio after 1,000 cycles versus initial capacitance (%) | 90.0% | 90.5% | 71.5% | 79.3% |

TABLE 8

Table 5 <Lithium Ion Capacitor>

|  | Working examples | | | Comparative examples |
| --- | --- | --- | --- | --- |
|  | 4-1 | 4-2 | 4-3 | 4-1 |
| Positive electrode | A | H | A | H |
| Negative electrode | N | F | F | N |
| Initial electrostatic capacitance (F/g) | 63.4 | 59.1 | 60.2 | 60.2 |
| Capacitance maintenance ratio after 10,000 cycles versus initial capacitance (%) | 93.1% | 91.5% | 97.3% | 70.6% |

Based on the results shown in the Tables 1 to 5, when composites 8 to 12 (evaluation electrodes I to M, respectively) were used, which did not satisfy the conductive polymer content condition and/or the XPS spectrum peak area ratio condition, the capacitance maintenance ratio became higher in comparison to the cases when activated carbon was used (evaluation electrode H) (Comparative Examples 2-1 to 2-6). Moreover, when the composite 13 (evaluation electrode O) was used, although the capacitance maintenance ratio became higher than that found when using graphite (evaluation electrode N) was used, the capacitance maintenance ratio in both cases was found to be less than or equal to about 80% (Comparative Example 3-1 and 3-2). Furthermore, even when activated carbon (evaluation electrode H) and graphite (evaluation electrode N) were used, the capacitance maintenance ratio was found to be less than or equal to about 80% (Comparative Example 4-1). Furthermore, when aniline (electropolymerizable additive) was added as in Patent Document 4, it was found there was almost no improvement in the capacitance maintenance ratio (Comparative Example 2-7).

In contrast, when the composites 1 to 7 (evaluation electrodes A to G, respectively) were used in which a specific weight of nitrogen atom-containing conductive polymer was composited with the porous carbon material, and in which the peak area ratio (nitrogen/carbon ratio) of nitrogen atoms and carbon atoms in the XPS spectrum was in the specified range, the capacitance maintenance ratio relative to the initial capacitance became greater than or equal to 90%, and the cycle characteristics are understood to have been excellent (Working Examples 2-1 to 2-5, 3-1, 3-2, and 4-1 to 4-3).

What is claimed is:

1. A composite comprising: 0.5 to 5 parts by mass of a conductive polymer having nitrogen atoms per 100 parts by mass of a porous carbon material; wherein a ratio of peak area derived from nitrogen atoms to peak area derived from carbon atoms (nitrogen/carbon ratio) in the spectrum by X-ray photoelectron spectroscopy is from 0.005 to 0.05.

2. The composite according to claim 1; wherein number average molecular weight of the conductive polymer is from 2,000 to 20,000.

3. The composite according to claim 1; wherein the conductive polymer is at least one selected from the group consisting of polyaniline, polypyrrole, polypyridine, polyquinoline, polythiazole, polyquinoxaline, and derivatives thereof.

4. The composite according to claim 1; wherein the porous carbon material is activated carbon and/or graphite.

5. An electrode material comprising the composite described in claim 1.

6. An electric double-layer capacitor comprising a polarizable electrode using the electrode material described in claim 5.

7. A lithium ion secondary battery having a negative electrode comprising the electrode material described in claim 5.

8. A lithium ion capacitor having a positive electrode and/or a negative electrode comprising the electrode material described in claim 5.

9. The composite according to claim 2; wherein the conductive polymer is at least one selected from the group consisting of polyaniline, polypyrrole, polypyridine, polyquinoline, polythiazole, polyquinoxaline, and derivatives thereof.

10. The composite according to claim 2; wherein the porous carbon material is activated carbon and/or graphite.

11. The composite according to claim 3; wherein the porous carbon material is activated carbon and/or graphite.

12. An electrode material comprising the composite described in claim 2.

13. An electrode material comprising the composite described in claim 3.

14. An electrode material comprising the composite described in claim 4.

15. An electric double-layer capacitor comprising a polarizable electrode using the electrode material described in claim 12.

16. A lithium ion secondary battery having a negative electrode comprising the electrode material described in claim 12.

17. A lithium ion capacitor having a positive electrode and/or a negative electrode comprising the electrode material described in claim 12.

18. An electric double-layer capacitor comprising a polarizable electrode using the electrode material described in claim 13.

19. A lithium ion secondary battery having a negative electrode comprising the electrode material described in claim 13.

20. A lithium ion capacitor having a positive electrode and/or a negative electrode comprising the electrode material described in claim 13.

21. An electric double-layer capacitor comprising a polarizable electrode using the electrode material described in claim 14.

22. A lithium ion secondary battery having a negative electrode comprising the electrode material described in claim 14.

23. A lithium ion capacitor having a positive electrode and/or a negative electrode comprising the electrode material described in claim 14.

24. The composite according to claim 1, wherein the composite consists essentially of 0.5 to 5 parts by mass of the conductive polymer having nitrogen atoms per 100 parts by mass of the porous carbon material, wherein the ratio of peak area derived from nitrogen atoms to peak area derived from carbon atoms (nitrogen/carbon ratio) in the spectrum by X-ray photoelectron spectroscopy is from 0.005 to 0.05.

* * * * *